United States Patent

Ohlmeyer et al.

[11] 4,152,033
[45] May 1, 1979

[54] APPARATUS FOR THE GASTIGHT FASTENING OF A FOIL CONTAINER

[75] Inventors: Manfred Ohlmeyer, Leopoldshafen; Erich Windbühl, Weingarten, both of Fed. Rep. of Germany; Johann Pedrerol, Zürich, Switzerland

[73] Assignee: Gesellschaft für Kernforschung m.b.H., Karlsruhe, Fed. Rep. of Germany

[21] Appl. No.: 866,161

[22] Filed: Dec. 30, 1977

[30] Foreign Application Priority Data

Dec. 31, 1976 [DE] Fed. Rep. of Germany ....... 2659787

[51] Int. Cl.² .............................................. A61G 11/00
[52] U.S. Cl. ..................................... 312/1; 24/243 K; 34/242; 74/18; 128/1 B; 138/109; 403/50; 403/326
[58] Field of Search ............................ 312/1; 138/109; 128/1 B; 24/243 K; 2/159, 161 R; 403/326, 50; 285/321; 34/242; 74/18, 18.1, 18.2

[56] References Cited

U.S. PATENT DOCUMENTS

| | | | |
|---|---|---|---|
| 2,598,532 | 5/1952 | Gibbon | 128/1 B |
| 3,541,648 | 11/1970 | Townsend et al. | 312/1 |
| 4,010,588 | 3/1977 | Eisert | 312/1 |

FOREIGN PATENT DOCUMENTS 1461884  1/1974  Fed. Rep. of Germany ........... 312/1 B

*Primary Examiner*—Mervin Stein
*Assistant Examiner*—Alex Grosz
*Attorney, Agent, or Firm*—Spencer & Kaye

[57] ABSTRACT

In order to reliably and safely secure a flexible container, such as a glove, to an opening in a housing, which opening is surrounded by a tubular stud projecting outwardly from the housing, the stub is provided with at least two grooves in its interior wall, each groove having an omegoid cross-section, and the flexible container is clamped in each groove by a clamping ring having a circular cross-section corresponding to that of the central portion of the cross-section of its associated groove.

3 Claims, 4 Drawing Figures

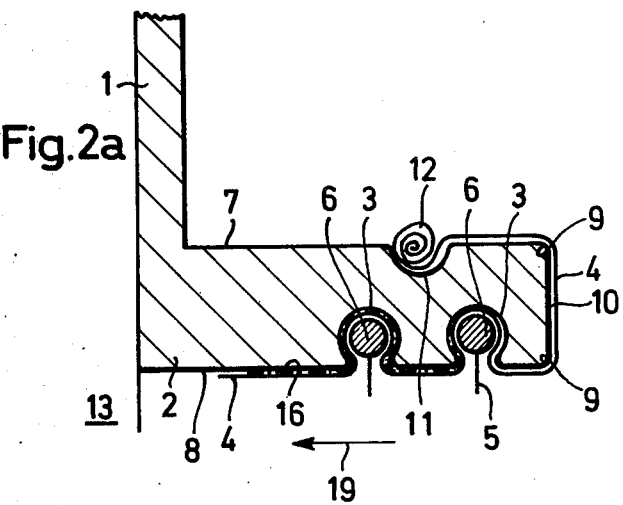
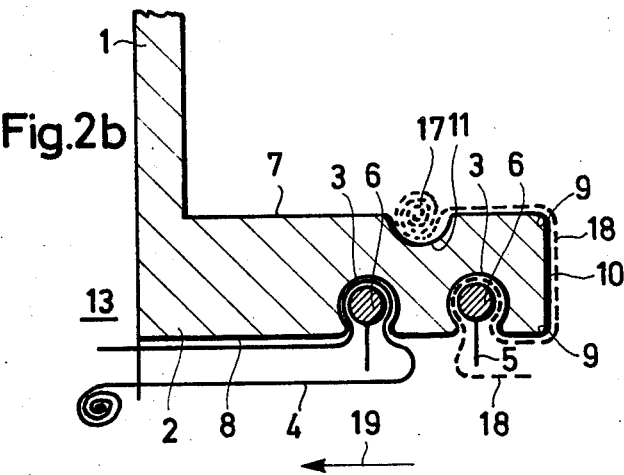

4,152,033

APPARATUS FOR THE GASTIGHT FASTENING OF A FOIL CONTAINER

BACKGROUND OF THE INVENTION

The present invention relates to an apparatus for the fastening of a foil container, such as, for example, a plastic glove, to a cylindrical stud, or pipe end in a hermetically sealed, or gastight, manner with the aid of circumferential grooves and clamping rings disposed in the grooves.

Containers made of flexible foils, such as, for example, hoses, bags or plastic gloves, must often be connected in an airtight manner to a housing or similar chamber for purposes of packaging or to permit manipulation of objects disposed in such housing.

A preferred field of use of the present invention is for the connection of a plastic glove to a glove box under subatmospheric pressure, such as is used in the nuclear art to handle radioactive substances. In addition, it is often necessary to package filters in filter boxes or to replace them according to the plastic bag method where the filters, the interior of the filter box and the interiors of the plastic bags or gloves, respectively, may be contaminated with radioactivity. In working according to the plastic bag method, the filters including the foil must be replaced in such a manner that during the exchange no contamination can reach the surrounding environment.

One apparatus of the above-mentioned type is disclosed in German Pat. No. 1,461,884. In this apparatus the grooves required to fasten the plastic bag are provided on the exterior circumference of the pipe end in question.

SUMMARY OF THE INVENTION

It is an object of the present invention to improve the fastening of the glove or plastic bag in such a connection, to increase the resulting sealing effect, to reduce the wear experienced by the plastic bag, and to increase the durability of the connection.

These and other objects of the present invention are achieved by providing at least two grooves in the interior wall of the pipe end, each groove having an omegoid cross-section and its associated clamping ring having a circular cross-section corresponding to the center portion of the groove cross-section.

The particular advantage of this design according to the invention is that the regions of significant wear in, for example, a plastic glove at the frontal face of the connecting pipe or at the edges of the frontal face are eliminated. Moreover the area of potential contamination at the connecting pipe is reduced and transferred to the zone of the pipe which is exposed to an inwardly directed stream of air.

According to a further feature of the invention, there is provided, in addition to the two grooves in the interior wall of the pipe end, a further groove on its exterior wall, the outer groove preferably being disposed, when viewing a cross-section containing the axis of the pipe end, between the two inner wall grooves. In this way it is easy to replace the glove or to improve the procedure for replacing the foil container at the pipe end.

BRIEF DESCRIPTION OF THE DRAWINGS

FIGS. 2a and 2b are views similar to those of FIGS. 1a and 1b, but illustrating a preferred embodiment of the invention.

DESCRIPTION OF THE PREFERRED EMBODIMENTS

Each Figure shows a cross-section of a thick-walled pipe end 2 fastened to the wall of a housing, or glove box, 1 so as to surround an opening into the interior 13 of the housing. The pipe end has the form of a cylinder whose axis is horizontal with respect to the view provided by each Figure and lies in the plane of each Figure. The pipe end is provided with two parallel grooves 3 each extending around the circumference of the pipe.

Figure 1A:
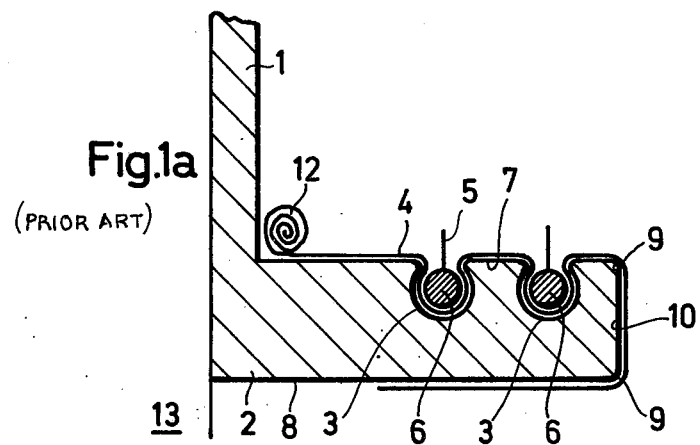
FIGS. 1a and 1b are cross-sectional detail views of a connection device according to the prior art in two stages of replacing a foil container.
Figure 1B:
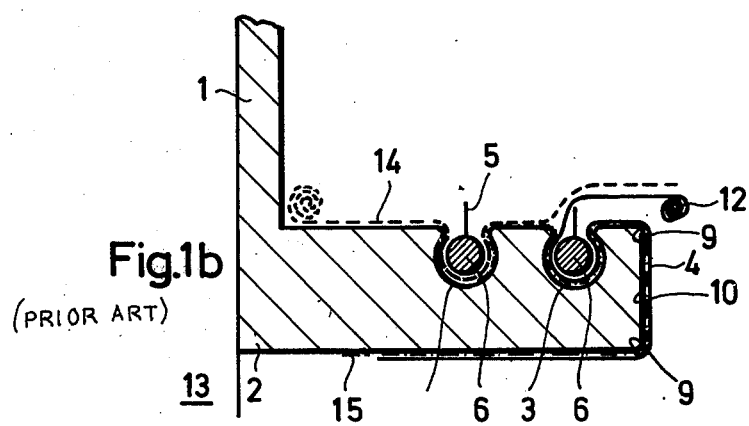

In the prior art device shown in FIGS. 1a and 1b, the grooves 3 are disposed in the outer wall 7 of pipe end 2, while in the device according to the present invention they are formed in the interior wall 8 of the pipe end 2.

Each groove 3 has an omegoid cross-sectional shape, i.e. the shape of the capital Greek letter omega formed of three arcuate sections which are contiguous to one another. The radius of the center arcuate section, which forms the bottom of the groove, corresponds approximately to the radius of a rubber clamping ring 6. The two outer arcuate sections of each groove form a constricted opening of the groove and each clamping ring is equipped with one or a plurality of pulling tongues 5 passing through this opening of its respective groove 3. The opening of each groove 3 is smaller than the cross-sectional diameter of the unit formed by its associated clamping ring 6 and two thicknesses of foil 4 passing around the ring, the groove opening being measured at the level of maximum constriction, or at its narrowest point.

Experiments have shown that it is advisable to make the width of the groove at the narrowest point about 20% less than the undeformed thickness of the rubber ring 6 and to make the pipe end 2 of a relatively stiff material.

The greatest danger to the integrity of the foil fastening, or of damage to the foil or the glove 4, are here the edges 9 of the frontal face 10 of the pipe end 2, since the subatmospheric pressure at the interior 13 of the housing 1 pulls the foil or glove 4 into the container and thus over the inner edge 9. The same stress additionally occurs at outer edge 9 as a result of the peripheral tension to which the foil or glove 4 is subjected. With each manipulation there occurs a certain amount of wear at these points so that the glove or the foil 4 must be replaced after but a short period of use.

In the pipe end according to the invention, shown in FIGS. 2a and 2b, a further groove 11 is provided in the exterior wall 7 of the pipe end 2. Groove 11 may have a normal, e.g. semicircular, cross-sectional outline and may have a different location along the pipe end than the two grooves 3 disposed in the interior wall 8.

The conventional technique of replacing a glove or plastic bag 4 will be described briefly with reference to FIGS. 1a and 1b. FIG. 1a shows the normal operating position of the open end of glove 4, which is pulled inside out over the edges 9 and the frontal face 10 and fastened to the exterior wall 7 in the grooves 3. The sealing bead, or rolled end, 12 of the glove 4 merely rests on the exterior wall 7 of pipe end 2.

During the exchange phase shown in FIG. 1b, the glove 4 which is being detached from the pipe end has been released from the rear one of grooves 3, which is the groove furthest from frontal face 10, and with its sealing bead 12 in the lead it is inverted into the interior of the container 1. Before glove 4 is released from the front groove 3, however, a new glove 14 (shown in broken lines) has been fastened in the then free rear groove and the new glove 14 is later additionally fastened in the front groove once the old glove 4 has been pulled completely into the container interior 13.

In addition to the drawback of stress on the glove at edges 9, there exists the possibility that the pipe end is contaminated up to the rear groove 3, approximately over the area represented by dot-dash line 15, so that if the glove 4 should be broken at an edge 9, there exists the danger of escape of contaminants.

The novel technique of exchanging gloves made possible by the novel structure of the pipe end according to the invention will now be described with reference to FIGS. 2a and 2b. FIG. 2a shows the normal fastened position of a glove 4 on the interior wall 8 of the pipe end 2. This is made possible by the placement of grooves 3 in the interior wall 8. Since the clamping rings 6 act without peripheral tension, i.e. are held in grooves 3 only by pressure forces, fastening in this manner is possible without difficulty. In its operating position, the glove 4 is pulled into the interior 13 of the glove box 1 by the subatmospheric pressure, and its edge with bead 12 is pulled outwardly over frontal face 10 and lies at least partly in groove 11. The possibly contaminated area 16 of this embodiment of the pipe end extends to the outer one of the two grooves 3, i.e. the regions of glove 4 endangered by peripheral tension at edges 9 now no longer lie in the possibly contaminated area 16 so that if there is a leak in the glove no contaminants can escape at these points.

FIG. 2b illustrates an intermediate point in the replacement of the glove 4. The bead 12 of the old glove 4 is released from groove 11. Then the bead 17 of a new glove 18 is seated in this groove, bead 17 being dimensioned to fit snugly in groove 11. Thereafter, glove 4 is released from the outer, or frontal, one of grooves 3 and pulled into area 13 under the influence of the subatmospheric pressure therein and without any aid from outside. The new glove 18 is then fastened in the frontal groove 3, after which glove 4 can be removed from the rear groove and glove 18 can be secured thereon, and the new glove is then ready to be used.

The same exchange process can also be performed just as easily with different types of foil containers, such as, for example, plastic bags for the replacement of radioactively contaminated filters. The significant advantages of the present invention reside mainly in a reduction of the extent of the contaminated area 15 or 16, respectively, which, on the possible occurrence of a leak, comes to lie, in the arrangement according to the invention, in the area of the stream of air 19 directed toward the interior 13 of the glove box. Moreover, the stress on the glove or the foil, respectively, at the edges of the pipe end frontal face is reduced substantially, which leads to an increased useful life for the gloves or bags, respectively.

It will be understood that the above description of the present invention is suceptible to various modifications, changes and adaptations, and the same are intended to be comprehended within the meaning and range of equivalents of the appended claims.

What is claimed is:

1. In a device for fastening a flexible foil container to a housing, the device including a tubular stud surrounding an opening in, and projecting outwardly from, the housing, the stud being provided with circumferential grooves, and a clamping ring arranged to be secured in each groove for clamping the flexible foil container in the groove, the improvement wherein: there are at least two said grooves in the interior wall of said stud; each said groove has an omegoid cross-section; and said clamping ring for each said groove has a circular cross-section corresponding dimensionally to the center arcuate section of said groove cross-section.

2. An arrangement as defined in claim 1 wherein said stud is provided with a further circumferential groove in its exterior wall.

3. An arrangement as defined in claim 2 wherein said further groove is located between two of said grooves in the interior wall of said stud, relative to the direction of the axis of said stud.

* * * * *